3,790,575
QUINACRIDONE PIGMENTS

Frederick J. Hafele, Paterson, N.J., and Hugh M. Smith, Staten Island, N.Y., assignors to Sun Chemical Corporation, New York, N.Y.
No Drawing. Filed Jan. 11, 1971, Ser. No. 105,606
Int. Cl. C07d 39/00
U.S. Cl. 260—279 R                                      7 Claims

ABSTRACT OF THE DISCLOSURE

The properties of quinacridones are improved by contacting the crude non-pigmentary quinacridone with a mixture of aqueous sulfuric acid and xylene sulfonic acid, drowning the product in a water-miscible organic diluent, and recovering the pigment product.

---

This invention relates to the manufacture of improved pigmentary quinacridone predominantly in the alpha crystal phase. More specifically, it relates to the conditioning of linear-trans-quinacridone into an intense red pigment.

The importance of both red and violet pigments which may be obtained from linear-trans-quinacridone is well known. In Justus Liebig's Annalen der Chemie, 518 (1933), pages 245–249, and in U.S. Pat. No. 2,821,529, for example, the preparation of linear-trans-quinacridone (hereafter termed "quinacridone") is described, and the high stability of this colored compound toward chemical and physical agents is noted. Thus, quinacridone is potentially a very valuable pigment; however, its practical use is hindered by the fact that the necessary conditioning required for transformation of the non-pigmentary product into a pigment dyestuff characterized by uniform crystalline and finely divided structure with intense, permanent, coloring power is particularly difficult and costly.

A number of methods have hitherto been employed for the conditioning or finishing of non-pigmentary quinacridone, often referred to as quinacridone "crude" (on grounds of tinctorial strength rather than chemical purity). These methods include processes as salt milling the crude in the presence or absence of a small amount of an organic liquid, followed by contacting it with a polar organic liquid; contacting it with a polar organic liquid such as dimethylformamide or dimethylsulfoxide without prior milling; acid pasting, that is, dissolving the crude quinacridone in a concentrated mineral acid, e.g., sulfuric or polyphosphoric, and then regenerating it by reducing the acid concentration, followed by contacting the paste with water or a polar organic liquid; dissolving the crude material in a solvent such as an alcoholic alkali and precipitating the product by diluting with water; and so forth. These methods have the disadvantage of using very costly materials, which may necessitate the employment of solvent and other recovery systems, and often do not yield a product of sufficient color strength to render it suitable for commercial application.

Alpha-phase quinacridone is an extremely lightfast, intense blue-shade red pigment. It is potentially useful for the coloration of paints, printing inks, polymeric materials, and the like; however, previous attempts to obtain high performance alpha-phase quinacridone have been unsuccessful, due to an inherent tendency in the pigment crystal to undergo a change from the alpha to the gamma phase on contact with crystallizing solvents of types well-known in the technology of copper phthalocyanines and other high performance pigments. Examples of such solvents are aromatic hydrocarbons, such as xylene and nitrobenzene; ketones, such as methylisobutylketone; glycols, such as ethylene and diethylene glycols; and chlorinated hydrocarbons, such as trichlor- and perchlorethylene. As a result of such crystal phase instability, tinctorial power is reduced, desired redness of tone is lost, and the application of alpha-phase quinacridone with this deficiency is unfeasible in commercial end usage requiring contact of the pigment with crystallizing solvents.

It has now been found that an improved alpha-phase quinacridone red pigment, tinctorially stronger than has hitherto been known and exhibiting excellent resistance to crystallization from solvents, is readily obtainable from crude, non-pigmentary quinacridone, regardless of the method of manufacture, by a novel acid (permutoid) swelling procedure. The process of this invention involves contacting the crude quinacridone with a solution of xylene sulfonic acid in aqueous sulfuric acid and subsequently adding the acid-swollen mixture to a water-miscible organic diluent liquid. The process differs from the more common technique known as "acid pasting" wherein a non-pigmentary crude is dissolved in a strong acid and subsequently reprecipitated in water or organic liquid diluent as follows: "acid swelling" ("permutoid swelling") involves the use of an appreciably less concentrated acid than does "acid pasting" and results in a suspension of the acid salt of the pigment, rather than a true solution in the acid. This suspension "swells" on continued contact with the acid and so changes the pigment crystal that, upon hydrolysis by additional contact with an excess of water or organic liquid diluent, the resultant pigment differs substantially from the corresponding acid-pasted product, e.g., in crystalline phase, texture, and resistance to crystallization by solvents.

In general, the process of the present invention is carried out by subjecting non-pigmentary quinacridone, regardless of its crystal phase, to an acid-swelling operation involving a solution of xylene sulfonic acid (conveniently made in advance by reacting xylene with sulfuric acid) in aqueous sulfuric acid having a density ranging from about 50 to 60 degrees Baumé. The acid-swollen material is then added to a water-miscible organic liquid from which the pigmentary quinacridone precipitates. The pigment is then isolated, for example by filtering, washing with alkali and water, and drying. Although in acid-pasting procedures equally good or even superior products are obtained when the acid mixture is struck into water rather than into an organic diluent, the excellent results of the present invention are obtained only with an organic liquid, not with water.

The water-miscible organic diluent used with the acid-swollen mixture may be, for example, an alcohol such as methanol, ethanol, isopropanol, ethylene glycol, diethylene glycol, or the like; lower aliphatic carboxylic acid, such as acetic acid; and so forth; and their mixtures. The preferred liquid diluent is methanol.

Products having maximum tinctorial strength are obtained by use of aqueous xylene sulfonic acid/sulfuric acid mixtures having a density between about 55 and 57 degrees Baumé. Products having little or no tinctorial strength are formed at densities above about 60 degrees Baumé, while there is no appreciable swelling of the pigment when the aqueous sulfuric acid has a density below about 50 degrees Baumé.

It is important that the aqueous sulfuric acid contain xylene sulfonic acid in order to facilitate the required swelling process and yield tinctorially strong products. The use of aqueous sulfuric acid alone or in combination with other aromatic sulfonic acids, such as toluene sulfonic acid, has given pigmentary quinacridones that are tinctorially weaker, inferior in purity of shade, and commercially less acceptable as pigments than the products prepared according to the process of this invention. The amount of the xylene sulfonic acid may range from about 5 to 9, and preferably about 6 to 7, parts per 100 parts of aqueous sulfuric acid.

The amount of xylene sulfonic acid-aqueous sulfuric acid mixture used in the above-mentioned acid-swelling treatment is not unduly critical. In general, a ratio of about 10 to 15 parts of the acid mixture per part of the crude pigment will produce satisfactory results, although less acid may be used if desired.

In general, the swelling time may range from about 4 to 24 hours, and preferably about 5 to 7 hours, at a temperature ranging from about 10° C. to 25° C., and preferably about 15° C. to 20° C. Higher temperatures lead to sulfonation of the quinacridone.

The rate of the precipitation of the acid-swollen mixture into the organic diluent is not unduly critical. Equivalent results are obtained, for example, on striking into methanol over 2 minutes and over 30 minutes.

The product of the process of this invention is a red, modified alpha-phase quinacridone pigment exhibiting higher tinctorial strength than that produced by conventional acid-pasting and other procedures which yield conventional unmodified alpha-phase pigment. In addition, the new product has outstanding resistance to crystallization in aromatic and other solvents, whereas the conventional acid-pasted products have little or no resistance to crystallization in such solvents and suffer a substantial loss in tinctorial strength in the process of converting from the alpha to the gamma crystal phase.

The following examples are illustrative of the present invention and are not intended to restrict its scope or the manner in which it may be practiced. Unless otherwise stated, all parts are given by weight.

EXAMPLE 1

To 450 parts of sulfuric acid (96 to 98%) was added 22.5 parts of substantially anhydrous xylene at ambient temperature. The stirred mixture was warmed gradually to 80° C. and held at 80–85° C. for 1.5 hours. The mixture was then cooled to 20° C., 105 parts of ice added, and the density adjusted with water to 56 degrees Baumé. At 20–25° C., 45 parts of pulverized crude quinacridone, prepared by polyphosphoric acid ring closure of dianilinoterephthalic acid and precipitation with water as described, e.g., in U.S. Pat. No. 3,342,823, was added, and the resultant acid slurry allowed to stir for 6.5 hours at ambient temperature.

The acid-swollen mixture was then added over a 30-minute period to 3200 parts of methanol with stirring. The resultant precipitate was isolated by filtration, washed free of acid, and dried.

A red quinacridone pigment of unusually high strength, transparency, and brightness was obtained. It has an X-ray diffraction pattern characterized by three lines of strong intensity of interplanar spacing at 3.45A, 6.44A, and 14.31A; three lines of moderate intensity of interplanar spacing at 3.21A, 3.69A, and 6.97A; and two lines of low intensity of interplanar spacing at 4.31A and 5.40A. This pattern is characteristic of an alpha crystal phase quinacridone modified by a minor amount of gamma crystal phase quinacridone. The product exhibits excellent fastness properties when incorporated in printing inks, paints, and plastic materials. It exhibits excellent resistance to crystallization by organic solvents.

EXAMPLE 2

The procedure of Example 1 was repeated except that the material was struck into methanol over a period of 2 minutes. The pigment product was similar in all respects to that of Example 1.

EXAMPLE 3

The procedure of Example 1 was repeated except that the material was struck into glacial acetic acid instead of methanol. The pigment product was similar in all respects to that of Example 1.

EXAMPLE 4

For comparative purposes, the procedure of Example 1 was repeated except that the material was struck into water instead of methanol. The resulting pigment was considerably weaker and less bright than the products of Examples 1–3 and did not exhibit good resistance to crystallization by organic solvents. It has an X-ray diffraction pattern characterized by two intense lines close together with interplanar spacings of 3.21A and 3.45A; a third line of similar intensity with an interplanar spacing of 14.31A; two lines of moderate intensity with interplanar spacings of 3.33A ad 7.08A; and a weak line with interplanar spacing of 4.31A. This pattern is characteristic of unmodified alpha-phase quinacridone.

EXAMPLE 5

To 429 parts of sulfuric acid (96 to 98%) was added 39.5 parts of xylene sulfonic acid at ambient temperature. The mixture was diluted with ice-water to a density of 56 degrees Baumé. At 20–25° C., 45 parts of pulverized crude quinacridone was added, the resultant acid slurry allowed to stir for 6.5 hours at ambient temperature, and the acid-swollen mixture added over a 30-minute period to 3200 parts of methanol with stirring. The resultant precipitate was isolated by filtration, washed free of acid, and dried. The pigment product was similar in all respects to that of Example 1.

EXAMPLE 6

The procedure of Example 1 was followed except that beta-phase quinacridone, obtained by polyphosphoric acid ring closure of dianilinoterephthalic acid with subsequent strike into methanol, as detailed, e.g., in U.S. Pat. No. 3,257,405, was used instead of crude quinacridone. The pigment product was similar in all respects to that of Example 1.

EXAMPLE 7

The procedure of Example 1 was followed except in the absence of xylene. The resulting product was considerably weaker and less bright than the products of Examples 1–3 and 5–6.

EXAMPLE 8

The procedure of Example 5 was repeated with toluene sulfonic acid instead of xylene sulfonic acid. The pigment product was considerably weaker and less bright than the product of Example 7.

EXAMPLE 9

The product of Example 1 was repeated except that the density was 62 degrees Baumé. The product had little tinctorial strength.

While there are above disclosed but a limited number of embodiments of the process of the invention herein presented, it is possible to produce still other embodiments without departing from the inventive concept herein disclosed, and it is desired therefore that only such limitations be imposed on the appended claims as are stated therein.

What is claimed is:

1. A process for the preparation of quinacridone in the alpha crystal form modified by the gamma crystal form as a red pigment characterized by an X-ray diffraction pattern having three lines of strong intensity of interplanar spacing at 3.45A, 6.44A, and 14.31A; three lines of moderate intensity of interplanar spacing at 3.21A, 3.69A, and 6.97A; and two lines of low intensity of interplanar spacing at 4.31A and 5.40A which consists essentially of the steps of (1) treating at about 10 to 25° C. one part of crude quinacridone with about 10 to 15 parts of a mixture of about 100 parts of aqueous sulfuric acid and about 5 to 9 parts of xylene sulfonic acid having a density of about 50–60 degrees Baumé, (2) diluting the product of (1) with a water-miscible lower alkyl alcohol or lower aliphatic carboxylic acid, and (3) recovering the pigment product.

2. The process of claim 1 wherein the density of the mixture of sulfuric acid and xylene sulfonic acid is about 55 to 57 degrees Baumé.

3. The process of claim 1 wherein the diluent is methanol.

4. In a process for conditioning crude quinacridone by acid swelling with sulfuric acid, diluting with a water-miscible lower alkyl alcohol or lower aliphatic carboxylic acid, and recovering the product, the improvement which consists essentially of adding to the sulfuric acid about 5 to 9 parts of xylene sulfonic acid per 100 parts of sulfuric acid.

5. The improvement of claim 4 wherein the ratio of xylene sulfonic acid to sulfuric acid is about 6 to 7:100.

6. The improvement of claim 4 wherein the density of the mixture of sulfuric acid and xylene sulfonic acid is about 50 to 60 degrees Baumé.

7. A process for the preparation of quinacridone in the alpha crystal form modified by the gamma crystal form as a red pigment characterized by an X-ray diffraction pattern having three lines of strong intensity of interplanar spacing at 3.45A, 6.44A, and 14.31A; three lines of moderate intensity of interplanar spacing at 3.21A, 3.69A, and 6.97A; and two lines of low intensity of interplanar spacing at 4.31A and 5.40A which consists essentially of the steps of (1) treating at about 10 to 25° C. one part of crude quinacridone with about 10 to 15 parts of a mixture of about 100 parts of aqueous sulfuric acid and about 5 to 9 parts of xylene sulfonic acid having a density of about 50–60 degrees Baumé, (2) diluting the product of (1) with methanol, and (3) recovering the pigment product.

References Cited
UNITED STATES PATENTS

| | | | |
|---|---|---|---|
| 3,200,122 | 8/1905 | Streif | 260—279 R |
| 3,007,930 | 11/1961 | Manuer | 260—279 R |
| 3,726,873 | 4/1973 | Hashizume et al. | 260—279 |
| 3,697,464 | 10/1972 | Giambalvo et al. | 260—279 R |
| 3,265,699 | 8/1966 | Jaffe | 260—279 |
| 3,311,630 | 3/1967 | Tessandori | 260—279 |
| 3,362,957 | 1/1968 | West | 260—279 |
| 3,372,163 | 3/1968 | Tessandori | 260—279 |

DONALD G. DAUS, Primary Examiner

U.S. Cl. X.R.

106—288 Q